United States Patent [19]

Hardy et al.

[11] 4,230,825
[45] Oct. 28, 1980

[54] UNIFORM HYDROLYSIS CATALYST ADDITION TO ETHYLENE-VINYL ESTER POLYMERS

[75] Inventors: Michael F. Hardy, Cincinnati, Ohio; Terry Tgavalekos, Peabody, Mass.

[73] Assignee: National Distillers and Chemical Corporation, New York, N.Y.

[21] Appl. No.: 954,959

[22] Filed: Oct. 26, 1978

[51] Int. Cl.$^3$ ............................................. C08F 8/12
[52] U.S. Cl. ....................................... 525/62; 525/60
[58] Field of Search ........................... 526/10; 525/62

[56] References Cited

U.S. PATENT DOCUMENTS

| 2,983,696 | 5/1961 | Tocker | 526/10 |
| 3,519,701 | 7/1970 | Pilato et al. | 526/10 |
| 3,985,719 | 10/1976 | Hoyt et al. | 526/10 |
| 4,135,026 | 1/1979 | Hoyt et al. | 526/10 |

Primary Examiner—Stanford M. Levin
Attorney, Agent, or Firm—Kenneth D. Tremain

[57] ABSTRACT

Process for the production of partially-hydrolyzed ethylene-vinyl ester interpolymers by the controlled alcoholysis of the base resins, in which discoloration of the hydrolyzed products is suppressed by the rapid addition of the alcoholysis catalyst to the reaction medium. In reactions carried out over periods of from 0.5 to 200 minutes, the catalyst is thus added to the medium within periods of from 0.1 to 20 minutes at substantially uniform rates varying by no more than ±25% over the period of addition. Substantially colorless hydrolyzed resins of particular application for packaging films are thereby produced.

8 Claims, No Drawings

UNIFORM HYDROLYSIS CATALYST ADDITION TO ETHYLENE-VINYL ESTER POLYMERS

This application relates to an improvement in the process for the controlled alcoholysis of ethylene-vinyl ester interpolymers as described for example in U.S. Pat. No. 3,985,719. The hydrolyzed resins produced by the present process find particular application in the packaging films utilized for wrapping of fresh meat and other food products, e.g., as described in U.S. Pat. No. 3,985,719 and U.S. Pat. No. 4,135,026.

This invention relates to a process for the alcoholysis of ethylene-vinyl ester interpolymers, and more particularly to an improved process in which discoloration of the hydrolyzed polymers formed therein is inhibited or suppressed whereby to produce substantially colorless resin products particularly suitable for packaging film application.

As described in greater detail in the aforesaid U.S. Pat. No. 3,985,719, a wide variety of processes have heretofore been described for the hydrolysis of ethylene-vinyl ester interpolymers, particularly ethylene-vinyl acetate copolymers, by alcoholysis in hydrocarbon solvent media. It is recognized in the art that hydrolyzates thereby formed are frequently yellowed or otherwise discolored; a number of techniques have, accordingly, been proposed in the literature for the reduction of such discoloration. Thus, it has been suggested that discoloration of hydrolyzed ethylene-vinyl acetate copolymers may be suppressed or prevented, for example, by saponifying in the presence of one or more ketones or aldehydes, such as methyl ethyl ketone and diethyl ketone (Jap. Pat. No. 74 17,433; Chem. Abstrs. 82:58595g); or by slurrying the saponification reaction mixture with methyl acetate (Jap. Kokai No. 74 23,897; Chem. Abstrs. 81:92400d); or by performing the saponification in a stepwise manner (Jap. Pat. No. 70 34,152; Chem Abstrs. 74:43131 p); or by alcoholysis in the presence of light of certain wavelengths (U.S. Pat. No. 3,882,005).

It is a principal object of the present invention to provide an improved process for the alcoholysis of ethylene-vinyl ester interpolymers, wherein discoloration of the hydrolyzed products thereby formed is reduced, if not totally inhibited or suppressed.

SUMMARY OF THE INVENTION

In accordance with this invention it has been found that substantially colorless hydrolyzates of ethylene-vinyl ester interpolymers may be produced in the alcoholysis of such polymers in a reaction medium comprising as components thereof the polymer, a low-boiling alcohol, a hydrocarbon solvent and an alkaline or acidic catalyst, in which medium the polymer is incorporated in an amount of from about 20 to 50 percent of the aggregate weight of the hydrocarbon solvent and the low-boiling alcohol, and the catalyst is present in an amount of at least 0.1% by weight of the polymer. When such a medium is utilized for the alcoholysis, with the reaction usually being carried out over a period of from about 0.5 to 200 minutes, discoloration of the hydrolysis product is markedly reduced if not entirely eliminated by rapid, substantially uniform addition of the alcoholysis catalyst to the reaction medium. In particular, in accordance with the invention the catalyst is added to the medium during the reaction within a period of from about 0.1 to 20 minutes at a substantially uniform rate which does not vary by more than ±25% over the period of addition. We have found that, employing this technique, discoloration of the hydrolysis product is suppressed or entirely eliminated, substantially colorless polymers being thereby produced. In general, high color in the reaction medium favors relatively high color in the hydrolyzed product isolated therefrom. Accordingly, color of the reaction mixture is conveniently taken as a measure of the effect of catalyst addition rate, the color being measured on an aliquot of the reaction mixture in a suitable color comparator, e.g., Gardner-Hellige Varnish Comparator (Hellige Inc., Garden City, N.Y.) on a scale of 1–18 where a color of 1 is lightest and 18 the deepest color. Frequently, products of comparable white color are recovered from reaction mixtures of varying degrees of low color intensity. Usually, such solution color differences can be distinguished visually, although in the Gardner scale they are of the order of 1 or less. When discoloration is present in the reaction mixture, the potential exists for the color being absorbed by the product under some, if not all, conditions.

In the controlled alcoholysis process described in the aforesaid U.S. Pat. No. 3,985,719 hydrolysis products which are substantially free of discoloration are generally produced, notwithstanding the fact that catalyst addition times varying from almost instantaneous addition to addition over the entire alcoholysis reaction period may be utilized therein. In this process copolymer solids concentrations of about 18% by weight are usually employed and although discolored (tan) reaction mixtures are often observed at full hydrolysis, the resulting products are normally recovered without visible discoloration. It has been found, however, that discoloration of the hydrolysis product is particularly likely to occur when utilizing higher reactant concentrations which are of particular interest for commercial operations. Thus, for example, in large scale applications it is desirable to utilize relatively high concentrations of the ethylene-vinyl ester interpolymer and, particularly, high concentrations of catalyst, in order to minimize solvent usage and thereby decrease solvent recycles. The rapid uniform catalyst addition technique of the present invention finds particular application in such commercially important operations wherein, for example, the ethylene-vinyl ester interpolymer is incorporated in the reaction medium in an amount of from about 20 to 50 percent by weight of the hydrocarbon solvent/low-boiling alcohol mixture, and the catalyst is present in the medium in an amount of at least about 0.1%, and up to as much as 20%, by weight of the resin reacted. Employing these processes it has been found that the technique of rapid catalyst addition at uniform rate in accordance with the present invention is both necessary and sufficient to insure the formation of substantially colorless hydrolysis products.

In the case of the alcoholysis of ethylene-vinyl acetate copolymers discoloration of the hydrolyzates thereof has been attributed to the presence of residual alkali metal acetates and caustic soda (see U.S. Pat. No. 3,847,845). It appears, however, from the studies on which the present invention is based that product discoloration associated with slow catalyst addition and non-uniform rates is not associated with any reaction of the hydrolyzed product with the catalyst. Thus, it has been determined that, when a polymer partially hyrdrolyzed employing the rapid catalyst addition technique of the present invention is subjected to further hydrolysis with slow catalyst addition, discoloration does not occur (see Example 4 herein). Discoloration of the hydrolyzed polymer may thus rather be due to some unknown impurity or impurities or to some unknown structural feature of the original ethylene-vinyl ester interpolymer which is not found in a polymer partially hydrolyzed in accordance with the present invention. Whatever the mechanism, however, the present technique of rapid catalyst addition at uniform rates has been found to result in formation of hydrolysis products having markedly reduced, if not entirely eliminated, discoloration.

PREFERRED EMBODIMENTS OF THE INVENTION

The process of the present invention may, as indicated hereinabove, be utilized in the alcoholysis of ethylene-vinyl ester interpolymers containing anywhere from about 3 to 45, and preferably from about 15 to 40 weight percent of the vinyl ester, to effect hydrolysis of from about 5 to 95, preferably from about 40 to 80, mole percent of the vinyl ester content thereof. Most preferably, the controlled alcoholysis technique is utilized for the reaction of ethylene-vinyl acetate copolymers containing from about 20 to 35 weight percent vinyl acetate, to form hydrolysis products having residual vinyl acetate contents of from about 8 to 18 weight percent. Such products are particularly useful as packaging materials for fresh meat and produce, colorless, transparent film being formed therefrom. The use of such a colorless film is highly desirable for customer acceptance and, moreover, obviates the possibility that color bodies produced from prolonged catalyst addition during the hydrolysis may be extracted by the meat and produce to be wrapped and have a possibly deleterious physiological reaction on the ultimate consumer.

The controlled alcoholysis is carried out in a reaction medium in which the polymer to be hydrolyzed is dissolved in a mixture of a low-boiling alcohol and a hydrocarbon solvent in a concentration of from 20 to 50, preferably from about 22 to 40 weight percent of such mixture. The hydrocarbon and the low-boiling alcohol are suitably admixed in the reaction medium in the volumetric proportion of hydrocarbon solvent to alcohol of from 1:5 to 10:1, preferably from 1:1 to 5:1 (i.e., from 1 to 5 parts by volume of the alcohol per part of the hydrocarbon). The alkaline or acidic catalyst for the alcoholysis reaction is incorporated in the reaction medium in an amount of at least about 0.1% by weight of the ethylene-vinyl ester interpolymer to be hydrolyzed, preferably in the proportion of 1:1000 to 1:5 (0.1% to 20%), and, more desirably, from 1:200 to 1:25 (0.5% to 4%) parts by weight of the resin.

The ethylene-vinyl ester interpolymers, hydrocarbon solvents, low-boiling alcohols and alkaline or acidic catalysts which may be incorporated in the reaction medium utilized in the alcoholysis process hereof may comprise any of those materials more fully described in the aforesaid U.S. Pat. No. 3,985,719. Thus, while the invention is principally described in connection with the controlled alcoholysis of ethylene-vinyl acetate copolymers, it should be understood that the process is similarly applicable to the alcoholysis of other ethylene-vinyl ester interpolymers as defined in the aforesaid application. Similarly, while it is preferred to employ methanol as the low-boiling alcohol, benzene or toluene as the hydrocarbon solvent, and an alkali metal hydroxide or alkoxide (most preferably sodium hydroxide or sodium methoxide) as the alcoholysis catalyst, it will be understood that other materials within the scope of U.S. Pat. No. 3,985,719 may similarly be employed in the practice hereof.

It is further preferred to control the water level of the components of the alcoholysis reaction medium in the manner disclosed in U.S. Pat. No. 3,985,719. Preferably, the aggregate initial amount of water contained in the ethylene-vinyl ester polymer, the hydrocarbon solvent, the low-boiling alcohol and the catalyst components of the reaction medium is limited to no more than about 10% of the total weight of the medium. During the reaction, the water content of any additional portions of such components introduced for reaction is regulated as not to vary by more than about 50% by weight of the initial aggregate water content thereof. As further described in the aforesaid patent, the reaction medium is desirably maintained throughout the reaction under a dry, inert atmosphere and the alcoholysis is otherwise carried out under conditions preventing the addition or loss of substantial quantities of water to or from the medium.

The alcoholysis reaction is carried out at temperatures of from about 10° to 250° C., preferably from about 30° to 100° C. Under these conditions, the desired partial hydrolysis of the ethylene-vinyl ester interpolymer is effected within a reaction time of from about 0.5 to 200 minutes, preferably from about 15 to 60 minutes.

In accordance with the invention, when the alcoholysis reaction is performed in accordance with the preceding parameters, the alcoholysis catalyst is added to the reaction medium during the reaction within a period of from about 0.1 to 20 minutes, preferably within an addition time of from at least about one minute and most preferably from about one to 10 minutes. It is important that the catalyst not only be rapidly added to the reaction medium but that it be added at a substantially uniform rate. Thus, in one experiment (Example 3 herein), it was observed that discoloration of the hydrolysis product occurred though the catalyst was added to the reaction medium within but a 5.5-minute addition period, where only 5% of the catalyst was added in the initial 2.5 minutes of such period and the remaining 95% was added over the final 3 minutes of the addition period. Thus, it has been found in accordance with the present invention that discoloration of the desired hydrolysis products can only be avoided by both rapid, and substantially uniform, addition of the alcoholysis catalyst to the reaction medium.

The following examples illustrate particularly preferred embodiments of the present invention. The experiments 1–5 reported herein were carried out with "weathered-out" ethylene-vinyl acetate copolymers containing only traces of free vinyl acetate monomer (e.g., less than about 30 ppm). Freshly synthesized ethylene-vinyl acetate copolymers, containing about 0.5 weight percent or more free monomer, also become discolored upon alcoholysis, apparently because color bodies are also produced from the free monomer. The effect of catalyst addition time on freshly synthesized ethylene-vinyl acetate resins is shown in Example 6 herein, from which it is apparent that discoloration is an even greater problem than with weathered-out resin.

In the following examples all parts and percentages are given by weight and all temperatures are expressed in degrees Celsius, unless otherwise indicated.

EXAMPLE 1

Rapid Catalyst Addition in Solution Alcoholysis of EVA Copolymer Containing 28% Combined Vinyl Acetate A 125 g. portion of an ethylene-vinyl acetate copolymer containing about 28 weight percent VA was dissolved over a period of one hour in 425 ml. of benzene at 75°–80° C. under $N_2$. The benzene contained 370 ppm $H_2O$. The resulting solution was cooled to 71° C. and a solution of 1.1 g. of sodium hydroxide pellets in 85 ml. of methanol was added over five minutes. The methanol initially contained 245 ppm of water. The solution was heated and stirred for two hours at 70° C., after which 2.4 ml. of glacial acetic acid was added. (Acid is often added to destroy any remaining catalyst and prevent further reaction. Under the conditions of this alcoholysis it had been found that the reaction was substantially complete at this point and the addition of acid can be dispensed with.)

Thereafter 350 ml. of methanol was added to precipitate the product. The product was collected by filtration, washed twice with 125 ml. portions of methanol, and dried overnight at 50° C. in vacuum. The product was a white crumb, 108.5 g., and contained about 10 weight percent residual vinyl acetate.

EXAMPLE 2

Variation of Catalyst Addition Time in a Given Solution Alcoholysis Reaction The following example and control experiments illustrate the effect of the length of the catalyst addition period on the discoloration produced during alcoholysis. In each of the following tests the catalyst solution was added at a constant rate over the selected catalyst addition period. In some experiments, the catalyst addition time was carefully measured at intervals during the addition periods. In all of the experiments the concentration of the catalyst solution was the same.

Under a nitrogen atmosphere, 425 ml. of toluene was introduced into a 2-liter, 3-necked glass reaction flask equipped with a mechanical stirrer, thermometer, reflux condenser, dropping funnel and oil heating bath. The toluene was heated to 90°–95° C. with the bath and thereafter, with stirring, 125.0 g. of the ethylene-vinyl acetate copolymer was gradually added over a period of 0.5 hour. The contents of the flask were heated and stirred at 90°–95° C. for an additional 0.5 hour to complete dissolution of the polymer, the copolymer solution was cooled to about 65°–70° C., and the catalyst solution was added at a constant rate over the particular catalyst solution addition period chosen.

In each experiment the catalyst solution consisted of 1.1 g. of sodium hydroxide dissolved in 85 ml. of methanol, the catalyst being added by means of the dropping funnel. After catalyst addition was completed, the resulting solution was stirred at reflux for one hour. Observations were made during this period with respect to discoloration (yellow to tan) of the solution.

When color appeared, samples of the solution were withdrawn with a pipet and placed in a Gardner colorimeter, in which the Gardner color number was measured.

After the one hour reaction period, unless otherwise stated, 2.6 ml of glacial acetic acid was added to destroy any remaining alkali. Thereafter, 350 ml. of methanol for precipitation was gradually added over a 0.5 hour period. After stirring an additional 0.25 hour, the solution was cooled to 30° C.

The precipitated, hydrolyzed ethylene-vinyl acetate copolymer product was collected by filtration, washed twice with 100 ml. portions of methanol, and dried at 50° C. overnight in a vacuum oven. The weight percent residual VA content of the dried product was determined by saponification. Several experiments performed by this procedure, wherein the only substantial variation in conditions was the catalyst solution addition period, are listed in the following table,

TABLE 1

EFFECT OF CATALYST SOLUTION ADDITION RATE ON PRODUCT COLOR

| | EVA Copolymer | | Water Content of Solvents ppm[3] | | Catalyst Solution Addition[4] | | Reaction Solution Color (Gardner)[5] | Hydrolyzed Copolymer | | |
|---|---|---|---|---|---|---|---|---|---|---|
| | Free VAM. ppm[2] | VA Content, Wt. %[1] | Toluene | Methanol | Total time, min. | Rate ml./min. | | VA, Wt.g. | Wt. %[1] | Color |
| Control A | <16 | — | 202 | 640 | 30 | — | 3 | 111.6 | 9.51 | Light |
| Control B | <27 | 27.7[7] | 215 | 507 | 30 | 2.8 | 3 | 112.1 | 8.46 | Yellow |
| Control C | NO EVA COPOLYMER | | 136 | 901 | 30 | — | None[6] | — | — | — |
| Example 1 | <16 | — | 215 | 507 | 0.67 | — | None[6] | 112.3 | 10.3 | White |
| Example 2 | <27 | 27.7 | 188 | 507 | 2.5 | — | None[6] | 111.8 | 10.65 | White |
| Example 3 | <27 | 27.7 | 188 | 513 | 6.2 | 14 | None[6] | 111.8 | 10.69 | White |

[1]Vinyl acetate content by saponification.
[2]Vinyl acetate monomer content by gas-liquid chromatography.
[3]Karl Fischer analysis on solvents in the supply containers under $N_2$.
[4]Added gradually; where rates are stated, they were carefully measured.
[5]Maximum Gardner color during 1-hour period.
[6]No acetic acid added at end of reaction.
[7]Ultrathene UE 634 (U.S. Industrial Chemicals Co.) a commercial EVA resin containing 26.5–29.5 wt. % VA.

It may be seen from the table that, in the partial alcoholysis of an ethylene-vinyl acetate resin initially containing about 28 weight percent VA and only a trace (<27 ppm) of free vinyl acetate monomer, a catalyst addition period of 30 minutes results in strong discoloration (Gardner No. 3) of the reaction solution itself and, more importantly, in decided discoloration of the hydrolyzed copolymer product recovered. On the other hand, if the catalyst addition period is shortened to 6.2 minutes or less, no discoloration of the reaction solution is observed and the product is colorless. Slow catalyst addition also produces a product of a somewhat higher degree of hydrolysis (lower residual VA).

EXAMPLE 3

Comparison of the Effect of Irregular Catalyst Addition Rate

For purposes of further comparison, a hydrolysis experiment was carried out to demonstrate the effect of an irregular catalyst rate of addition, employing substantially the experimental technique described in Example 2, and utilizing one of the ethylene-vinyl acetate copolymers employed therein (27.7 weight percent combined VA and <27 ppm free VA), toluene containing 188 ppm of water, and methanol containing 507 ppm of water. The catalyst solution time was limited to a total of 5.5 minutes, but the rate of addition within this period was not constant; specifically, 5% (4.0 ml.) of the catalyst solution was added over the initial 2.5 minutes and the remaining 95% (81 ml.) of the catalyst solution was added over the following 3 minutes.

During the 2.5-minute period, when only 5% of the catalyst solution was added, yellow-brown discoloration developed immediately and was not affected when the remainder of the catalyst solution was added. At the end of the one-hour reaction period the reaction mixture was yellow-brown. No acetic acid was added. The hydrolyzed copolymer product recovered weighed 112.4 g., and was off-white in color (11.1% VA).

EXAMPLE 4

Avoidance of Subsequent Discoloration of Hydrolyzates Produced by Rapid Catalyst Addition This example is illustrative of the fact that the discoloration observed upon slow catalyst addition in the alcoholysis of the copolymer of Example 2 does not arise when a colorless, partially hydrolyzed product of a similar reaction formed with rapid catalyst addition is, in turn, subjected to further hydrolysis under substantially the same alcoholysis conditions employing, however, slow catalyst addition.

Thus, a colorless, partially hydrolyzed copolymer (125 g.) containing 9.40 weight percent VA, prepared by partial alcoholysis as described in Example 2 from an ethylene-vinyl acetate copolymer originally containing 27.8 weight percent VA and <32 ppm of free vinyl acetate monomer, employing a 10-minute catalyst addition time, was dissolved in 425 ml. of toluene (215 ppm $H_2O$). To the resulting solution at 65° C. (very faint tan color) was added a catalyst solution of 1.1 g. of sodium hydroxide dissolved in 85 ml. methanol (507 ppm $H_2O$) over a period of 29 minutes. After an additional 61 minutes at 65° C., the reaction solution was clear and had no visible discoloration. No acetic acid was added. A colorless product (119.7 g.) was recovered.

EXAMPLE 5

This example illustrates the results obtained with a freshly prepared EVA polymer containing unreacted vinyl acetate monomer (VAM).

A freshly prepared EVA copolymer containing 26.5% vinyl acetate and free monomer (VA) content of 0.37% was alcoholyzed by the procedure of Example 1 using a catalyst addition time of 5 minutes. At the end of one hour reaction period, the reaction mixture was yellow-brown but the isolated product was only slightly discolored (light tan). The residual VA content of the product was 11.6%.

When slow addition of catalyst is employed, the reaction mixture and the product are more discolored.

What is claimed is:

1. In the process for the alcoholysis of an ethylene-vinyl ester interpolymer containing from 3 to 45 weight percent of vinyl ester in a reaction medium comprising as components thereof said interpolymer, a low-boiling alcohol, a hydrocarbon solvent and an alkaline or acidic catalyst, the hydrocarbon solvent and low-boiling alcohol being incorporated in the reaction medium in the proportion from about 1:5 to about 10:1 parts by volume, wherein the interpolymer is incorporated in the reaction medium in an amount of from about 20 to about 50 percent by weight of the hydrocarbon solvent and low-boiling alcohol the improvement which comprises adding the catalyst to the alcoholysis reaction medium during the reaction within a period of from about 0.1 to about 20 minutes at a substantially uniform rate which does not vary over the period of catalyst addition by more than about ±25% to thereby provide an alcoholyzed interpolymer in which discoloration is inhibited or suppressed.

2. A process according to claim 1 wherein from 5 to 95 mole percent of said ester is hydrolyzed during the reaction.

3. A process according to claim 1 wherein the reaction is carried out at a temperature of from about 10° to about 250° C.

4. A process according to claim 1 wherein the ethylene-vinyl ester interpolymer alcoholyzed is either a freshly synthesized resin containing at least about 0.5 weight percent free vinyl ester monomer, or a weathered-out resin containing less than about 30 ppm of free vinyl ester monomer.

5. A process according to claim 1 wherein the ethylene-vinyl ester interpolymer alcoholyzed is an ethylene-vinyl acetate resin containing from about 15 to about 40 weight percent vinyl acetate; the reaction mixture contains from about 20 to about 35 weight percent of the ethylene-vinyl acetate resin in the hydrocarbon solvent and alcohol, the hydrocarbon solvent is incorporated in the reaction medium in an amount of from about one to above five parts by volume per part of the low-boiling alcohol and the catalyst is an alkali metal hydroxide or alkoxide and is incorporated in the reaction medium in an amount of from about 0.5 to about 4 percent by weight of the ethylene-vinyl acetate copolymer.

6. A process according to claim 5 wherein the alcoholysis reaction is carried out at temperatures of from 30° to 100° C. over a period of from 15 to 60 minutes.

7. A process according to claim 6 wherein the catalyst is added to the reaction medium during the reaction within a period of from one to 10 minutes at a substantially uniform rate varying no more than ±10% over the period of addition.

8. A process according to claim 1 wherein the aggregate water content of the resin, hydrocarbon diluent, low-boiling alcohol and catalyst is not more than 10% of the total weight thereof, the aggregate water content being regulated so as not to vary by more than 50% of said initial water content.

* * * * *